US011521165B2

(12) United States Patent
Qiu et al.

(10) Patent No.: US 11,521,165 B2
(45) Date of Patent: Dec. 6, 2022

(54) INFORMATION PROCESSING SYSTEM AND INFORMATION PROCESSING METHOD

(71) Applicant: TOYOTA JIDOSHA KABUSHIKI KAISHA, Toyota (JP)

(72) Inventors: Zekai Qiu, Nisshin (JP); Akie Sakiyama, Toyota (JP); Yusuke Takeuchi, Miyoshi (JP); Jun Hioki, Nagakute (JP); Shinji Sassa, Ama (JP); Hiromitsu Fujii, Kariya (JP); Keita Teruuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 391 days.

(21) Appl. No.: 16/822,109

(22) Filed: Mar. 18, 2020

(65) Prior Publication Data

US 2020/0327494 A1    Oct. 15, 2020

(30) Foreign Application Priority Data

Apr. 11, 2019  (JP) .............................. JP2019-075457

(51) Int. Cl.
G06Q 10/08    (2012.01)
G05D 1/00     (2006.01)
H04N 1/32     (2006.01)

(52) U.S. Cl.
CPC ....... *G06Q 10/0838* (2013.01); *G05D 1/0088* (2013.01); *H04N 1/32368* (2013.01); *G05D 2201/0213* (2013.01)

(58) Field of Classification Search
CPC ............. G06Q 10/0838; G05D 1/0088; H04N 1/32368

USPC ......................................................... 705/341
See application file for complete search history.

(56) References Cited

U.S. PATENT DOCUMENTS

2014/0330456 A1* 11/2014 Lopez Morales .... G05D 1/0022
                                                        701/3
2017/0213062 A1*  7/2017 Jones ................... G06K 7/1417
2019/0061939 A1   2/2019 Anand et al.

FOREIGN PATENT DOCUMENTS

| CN | 105279625 A   |   | 1/2016  |              |
|----|---------------|---|---------|--------------|
| CN | 106575389 A   | * | 4/2017  | ... G01S 19/01 |
| CN | 106708047 A   | * | 5/2017  |              |
| CN | 109255576 A   |   | 1/2019  |              |
| EP | 3785535 A1    | * | 3/2021  | ... A01N 31/06 |
| JP | 2003-321125 A |   | 11/2003 |              |
| JP | 2018-177439 A |   | 11/2018 |              |

(Continued)

*Primary Examiner* — Harry K Liu
(74) *Attorney, Agent, or Firm* — Oliff PLC

(57) ABSTRACT

An information processing system includes a vehicle and an information processing apparatus. The vehicle that includes an image capturing device and that delivers a package. The information processing apparatus that includes a processor configured to determine, in a case where a recipient is not present at a delivery destination of the package, reception of the package by a substitute person present at a residence different from that of the recipient. The vehicle captures the substitute person receiving the package, with the image capturing device. The processor is configured to transmit, in a case where reception of the package by the substitute person is completed, captured data of the image capturing device to a user terminal associated with the recipient. The vehicle is an autonomous vehicle.

5 Claims, 11 Drawing Sheets

(56) References Cited

FOREIGN PATENT DOCUMENTS

JP 6419915 B1 * 11/2018
JP 2019-036200 A 3/2019

* cited by examiner

FIG. 5

VEHICLE INFORMATION MANAGEMENT TABLE

| VEHICLE ID | POSITION |
|---|---|
| U001 | LLLL1 |
| U002 | LLLL2 |
| U003 | LLLL3 |

FIG. 6

USER INFORMATION MANAGEMENT TABLE

| USER ID | NAME | ADDRESS | CONTACT INFORMATION | SUBSTITUTE RECEPTION USAGE SETTING | SUBSTITUTE PERSON SELECTION METHOD | SUBSTITUTE CONTRACT SETTING | ACQUIRED INCENTIVE |
|---|---|---|---|---|---|---|---|
| U001 | FFSS1 | MMDDHH1 | ADD1 | YES | ARBITRARY | YES | |
| U002 | FFSS2 | MMDDHH2 | ADD2 | NO | — | YES | |
| U003 | FFSS3 | MMDDHH3 | ADD3 | YES | SPECIFIED | NO | |

FIG. 7

CANDIDATE SUBSTITUTE SPECIFICATION INFORMATION TABLE

| USER ID | CANDIDATE SUBSTITUTE #1 | | | |
| --- | --- | --- | --- | --- |
| | NAME | ADDRESS | CONTACT INFORMATION | ... |
| U001 | NNMM1 | MMDDHH11 | ADD11 | |
| U002 | - | — | — | |
| U003 | NNMM3 | MMDDHH31 | ADD31 | |

FIG. 8

DELIVERY INFORMATION MANAGEMENT TABLE

| DELIVERY ID | SPECIFIED DELIVERY TIME SLOT | DELIVERY DESTINATION | DELIVERY DESTINATION USER NAME | DELIVERY VEHICLE ID | AUTHENTICATION INFORMATION | SUBSTITUTE PERSON |
|---|---|---|---|---|---|---|
| D001 | - | ADD5 | NAME | VH01 | **** | - |
| D002 | MMDDHH2 | ADD2 | U002 | VH02 | **** | - |
| D003 | - | ADD3 | U003 | VH03 | **** | - |

INFORMATION PROCESSING SYSTEM AND INFORMATION PROCESSING METHOD

CROSS REFERENCE TO RELATED APPLICATION

This application claims the benefit of Japanese Patent Application No. 2019-075457, filed on Apr. 11, 2019, which is hereby incorporated by reference herein in its entirety.

BACKGROUND

Technical Field

The present disclosure relates to an information processing system and an information processing method.

Description of the Related Art

Delivering a package to a delivery box at a delivery destination by an autonomous vehicle is proposed (for example, Patent document 1).

CITATION LIST

Patent Document

[Patent document 1] Japanese Patent Laid-Open No. 2018-177439

However, some houses are not provided with a delivery box, and in such a case, the possibility of occurrence of re-delivery is high.

One aspect of the disclosure is aimed at providing an information processing system and an information processing method enabling reduction of re-deliveries.

SUMMARY

One aspect of the present disclosure is an information processing system comprising:

a vehicle that includes an image capturing device and that delivers a package; and an information processing apparatus that includes a processor configured to determine, in a case where a recipient is not present at a delivery destination of the package, reception of the package by a substitute person present at a residence different from that of the recipient, wherein the vehicle is configured to capture the substitute person receiving the package with the image capturing device, and the processor is configured to transmit, in a case where reception of the package by the substitute person is completed, captured data of the image capturing device to a user terminal associated with the recipient.

Another aspect of the present disclosure is an information processing method comprising:

determining, in a case where a recipient is not present at a delivery destination of a package that is delivered by a vehicle including an image capturing device, reception of the package by a substitute person present at a residence different from that of the recipient; and transmitting, in a case where reception of the package by the substitute person is completed, captured data captured by the image capturing device to a user terminal associated with the recipient, the captured data recording the substitute person receiving the package.

According to the information processing system and the information processing method of the disclosure, re-deliveries may be reduced.

BRIEF DESCRIPTION OF DRAWINGS

FIG. 5 is an example of a vehicle information management table in the center server;

FIG. 6 is an example of a user information management table in the center server;

FIG. 7 is a diagram illustrating an example of a candidate substitute specification information table in the center server;

FIG. 8 is an example of a delivery information management table in the center server;

DESCRIPTION OF THE EMBODIMENTS

Figure 1:
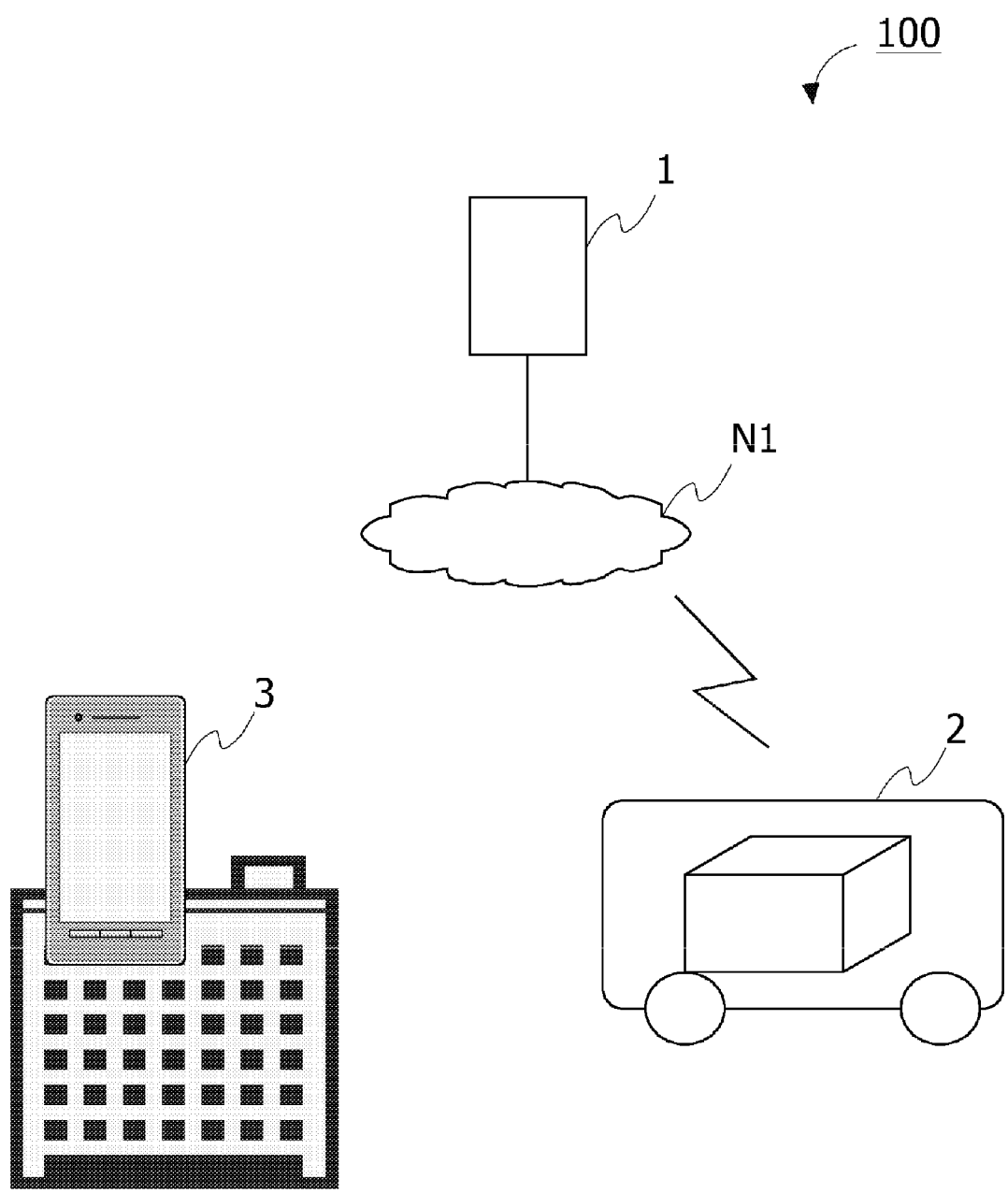
FIG. 1 is a diagram illustrating an example of a system configuration of a delivery system according to a first embodiment.

One aspect of the present disclosure is an information processing system including a vehicle that includes an image capturing device and that delivers a package, and an information processing apparatus that includes a processor configured to determine, in a case where a recipient is not present at a delivery destination of the package, reception of the package by a substitute person present at a residence different from that of the recipient. The vehicle may capture the substitute person receiving the package, with the image capturing device. The processor may transmit, in a case where reception of the package by the substitute person is completed, captured data of the image capturing device to a user terminal associated with the recipient.

For example, the processor may be provided in a server capable of communicating with a computer that is mounted in the vehicle, or may be provided in the computer that is mounted in the vehicle. If a package is received by the substitute person, re-delivery of the package becomes unnecessary even in a case where the recipient of the package is absent, and re-deliveries may be reduced. Moreover, because reception of the package by the substitute person is captured, and the captured data is transmitted to the user terminal of the recipient as an evidence, the recipient may check the substitute person and that the package is received by the substitute person, and the recipient may feel reassured. Furthermore, dishonest treatment of the package may be prevented, and safety of the package may be guaranteed to the recipient.

According to one aspect of the present disclosure, a memory configured to store user information including an address of a user may be further included, and the processor may select the substitute person from the memory, from users, registered addresses of whom are within a predetermined range of the delivery destination. This enables substitute reception of the package even when the substitute person is not specified by the recipient, and re-deliveries may be reduced. Furthermore, because the captured date capturing the substitute person receiving the package is transmitted to the user terminal of the recipient, a sense of uneasiness felt by the recipient in a case where the recipient and the substitute person are not acquaintances may be reduced, for example. Furthermore, because the substitute person is selected from the users, the registered addresses of whom are within a predetermined range of the delivery destination, a traveling distance to the substitute person for handing over of the package may be reduced, and efficiency is high. For example, in a case where the delivery destination and the address of the substitute person belong to the same apartment building, the vehicle does not have to travel to perform handing over to the substitute person.

According to one aspect of the present disclosure, a memory configured to store user information about a user specified by the recipient as a candidate substitute may be further included, and the processor may select the substitute person from the memory, from users specified by the recipient as candidate substitutes. This enables a user specified by the recipient to receive the package on behalf, and the recipient may feel reassured.

According to one aspect of the present disclosure, the vehicle may be an autonomous vehicle. However, such a case is not restrictive. By using an autonomous vehicle as the vehicle, the number of staff may be reduced.

An aspect of the present disclosure may be grasped in relation to an information processing method. The information processing method is an information processing method including determining, in a case where a recipient is not present at a delivery destination of a package that is delivered by a vehicle including an image capturing device, reception of the package by a substitute person present at a residence different from that of the recipient, and transmitting, in a case where reception of the package by the substitute person is completed, captured data captured by the image capturing device to a user terminal associated with the recipient, the captured data recording the substitute person receiving the package. Additionally, a technical idea disclosed in relation to the information processing system described above may be applied to the information processing method to the extent that no technical conflict exists.

In the following, an embodiment of the present disclosure will be described with reference to the drawings. The configuration of the embodiment described below is an example, and the present disclosure is not limited to the configuration of the embodiment.

<First Embodiment>
<System Overview>

FIG. 1 is a diagram illustrating an example of a system configuration of a delivery system 100 according to a first embodiment. For example, the delivery system 100 is a system that determines handing over of a package to a substitute person, in a case where a recipient is not present at a delivery destination. The delivery system 100 includes a center server 1, a vehicle 2, and a user terminal 3. The delivery system 100 is an example of the "information processing system".

For example, the vehicle 2 is an electric vehicle that is capable of autonomous driving and unmanned driving. In the first embodiment, the vehicle 2 is a vehicle that delivers a package to a predetermined delivery destination. The delivery system 100 includes a plurality of vehicles 2, but in FIG. 1, only one vehicle 2 is illustrated for the sake of convenience. For example, the vehicle 2 is connected to a network N1 through a wireless communication network, and is connected to the center server 1 through the network N1. For example, the vehicle 2 connects to the network N1 by performing mobile communication according to 3rd generation (3G), Long Term Evolution (LTE), LTE-Advanced or 5th generation (5G), or wireless communication according to wireless LAN standards such as WiFi or Dedicated Short Range Communications (DSRC). The network N1 is the Internet, for example.

The vehicle 2 creates an operation plan upon reception of an operation command from the center server 1, and performs autonomous driving to a destination according to the operation plan. The vehicle 2 includes position information acquisition unit, and acquires and transmits position information to the center server 1 every predetermined period.

For example, the user terminal 3 is a terminal owned by a user who is registered as a user in the delivery system 100 to receive a service of reception of a package by a substitute person, and by a user who is registered in the delivery system 100 as a substitute person who is to perform substitute reception of a package. In the following, the user terminal 3 of the recipient will be referred to as a recipient terminal. The user terminal of the substitute person will be referred to as a substitute person terminal. The delivery system 100 includes a plurality of user terminals 3, but only one user terminal is illustrated in FIG. 1 for the sake of convenience.

In the first embodiment, the vehicle 2 delivers a package by receiving a delivery request from the center server 1. The vehicle 2 transmits position information to the center server 1 every predetermined period, and a position of the vehicle 2 is thereby grasped by the center server 1. For example, in the case of detecting arrival of the vehicle 2 at the delivery destination, the center server 1 transmits a delivery vehicle arrival notification to a user associated with the delivery destination, or in other words, the user terminal 3 of the recipient. For example, in the case where there is no response from the recipient terminal, or a response indicating absence is received, the center server 1 determines absence of the recipient, and determines the substitute person who is to receive the package on behalf. The substitute person may be selected from candidate substitutes specified in advance by the recipient, or may be selected from users, the registered addresses of whom are within a predetermined range of the address of the delivery destination, for example.

Moreover, the vehicle 2 includes a camera, and captures the substitute person receiving the package from the vehicle 2, and when handing over of the package is complete, captured data is transmitted to the center server 1. The center server 1 transmits the captured data and a delivery completion notification regarding the package to the recipient terminal. The captured data may be a moving image or a still image. Furthermore, the captured data is captured to include a face of the substitute person and identification information of the package attached to the package, for example.

In this manner, by having the substitute person receive the package in a case where the recipient is not present at the delivery destination, re-delivery of the package by the vehicle 2 may be reduced. Furthermore, because the captured data capturing the substitute person receiving the package is transmitted to the recipient, an evidence that the package is reliably handed over to the substitute person may be provided to the recipient, and the recipient may feel reassured. Moreover, dishonest treatment of the package by the substitute person may be prevented.

Figure 2:
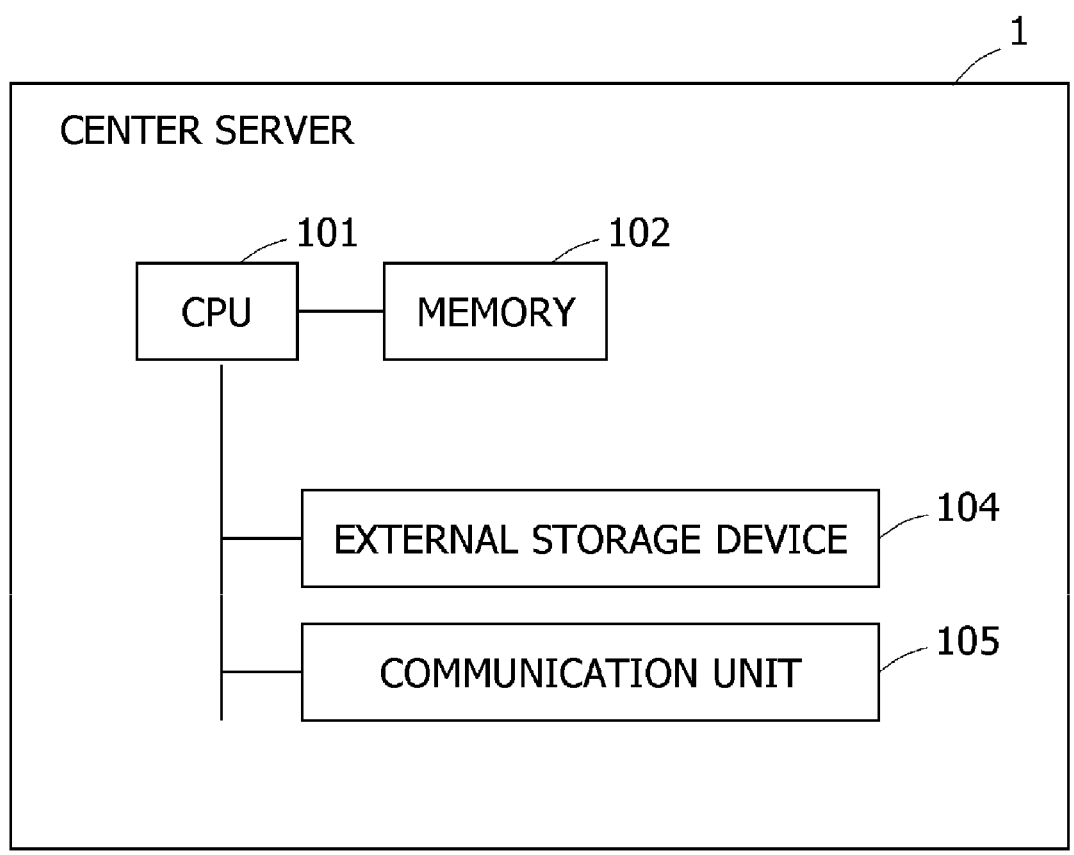
FIG. 2 is a diagram illustrating an example of a hardware configuration of the center server.

FIG. 2 is a diagram illustrating an example of a hardware configuration of the center server 1. The center server 1 includes a CPU 101, a memory 102, an external storage device 104, and a communication unit 105. The CPU 101 executes computer programs that are executably developed in the memory 102, and performs processes as the center server 1.

The memory 102 stores computer programs to be executed by the CPU 101, data to be processed by the CPU 101, and the like. For example, the memory 102 is a dynamic random access memory (DRAM), a static random access memory (SRAM), a read only memory (ROM) or the like. The external storage device 104 is a non-volatile storage, and is a solid state drive (SSD), a hard disk drive or the like, for example.

For example, the communication unit 105 communicates with various servers on the network N1, the vehicle 2, the user terminal 3, and the like through a public communication network by connecting to the public communication network through a LAN. Additionally, the hardware configuration of the center server 1 is not limited to the one illustrated in FIG. 2, and addition or substitution may be appropriately performed according to the embodiment.

Additionally, like the center server 1, the user terminal 3 includes a CPU, a memory, an external storage device, and a communication unit, but illustration thereof is omitted. Additionally, the communication unit of the user terminal 3 communicates with the center server 1 and the like by connecting to the network N1 by wireless communication according to 3rd generation (3G), 4G, Long Term Evolution (LTE), LTE-Advanced, WiFi or the like. Furthermore, the user terminal 3 is a mobile terminal such as a smartphone, a tablet terminal, a wearable terminal, a tablet PC or a mobile laptop computer, for example. Accordingly, the user terminal 3 includes, in addition to the CPU, the memory, the external storage device and the communication unit, a touch panel display, a microphone, a speaker, various sensors, and the like.

Figure 3:
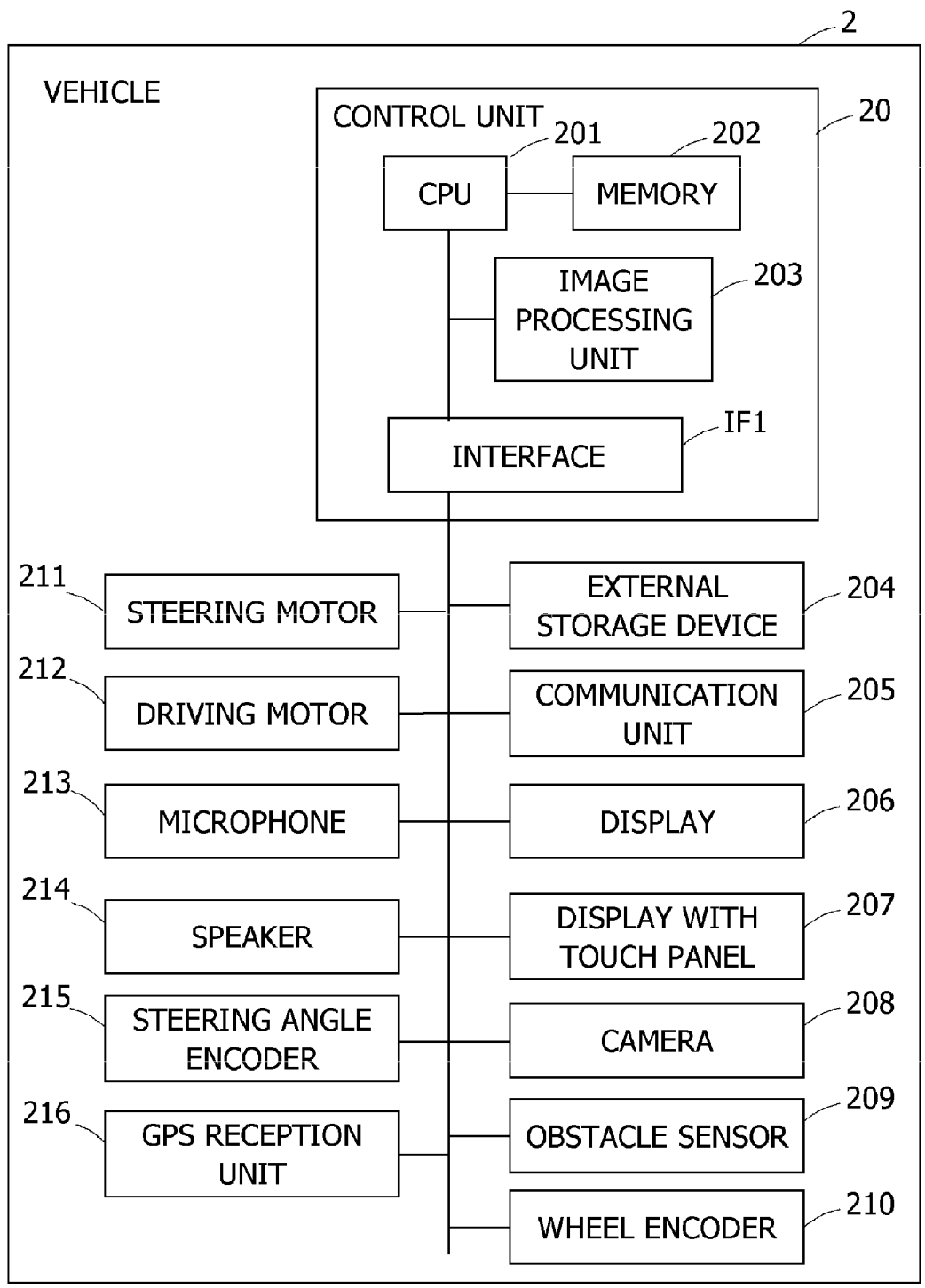
FIG. 3 is a diagram illustrating an example of a hardware configuration of the vehicle.

FIG. 3 is a diagram illustrating an example of a hardware configuration of the vehicle 2. In FIG. 3, a description is given assuming that the vehicle 2 is an electric vehicle that is capable of autonomous driving. Additionally, FIG. 3 extracts and illustrates hardware related to a control system.

The vehicle 2 includes a control unit 20, an external storage device 204, a communication unit 205, a display 206, a display 207 with a touch panel, a camera 208, an obstacle sensor 209, a wheel encoder 210, a steering motor 211, a driving motor 212, a microphone 213, a speaker 214, a steering angle encoder 215, and a global positioning system (GPS) reception unit 216.

The control unit 20 is also referred to as an electronic control unit (ECU). The control unit 20 includes a CPU 201, a memory 202, an image processing unit 203, and an interface IF1. The external storage device 204, the communication unit 205, the display 206, the display 207 with a touch panel, the camera 208, the obstacle sensor 209, the wheel encoder 210, the steering motor 211, the driving motor 212, the microphone 213, the speaker 214, the steering angle encoder 215, and the GPS reception unit 216 are connected to the interface IF1.

The obstacle sensor 209 is an ultrasonic sensor, a radar or the like. The obstacle sensor 209 emits an ultrasonic wave, an electromagnetic wave or the like in a detection target direction, and detects presence, a position, a relative speed or the like of an obstacle in the detection target direction on the basis of a reflected wave. The obstacle may be a pedestrian, a bicycle, a structure, a building or the like, for example. In the case where the vehicle 2 has a box-shaped body, for example, a plurality of obstacle sensors 209 are provided, and the plurality of obstacle sensors 209 are provided at positions near four corners at the front, back, left and right of the vehicle 2, respectively. Additionally, the front, back, left and right of the vehicle 2 are determined according to a traveling direction, for example.

The camera 208 is an image capturing device using an image sensor such as a charge-coupled device (CCD), a metal-oxide-semiconductor (MOS), a complementary metal-oxide-semiconductor (CMOS) or the like. The camera 208 acquires an image at a predetermined time interval called frame period, and stores the image in a frame buffer in the control unit 20. A plurality of cameras 208 are provided on the vehicle 2, and the plurality of cameras 208 are installed on respective ones of front, back, left and right side surfaces of the vehicle 2 while facing outward, for example. However, such a case is not restrictive, and some cameras 208 may be installed facing the inside of the vehicle. Furthermore, in the first embodiment, to capture the substitute person receiving the package from the vehicle 2, one of the plurality of cameras 208 is installed near a delivery port for packages of the vehicle 2 while facing outward.

The steering motor 211 controls an angle of a direction of a cross line at which a plane of rotation of a wheel and a horizontal plane intersect, or in other words, a traveling direction by rotation of the wheel, according to an instruction signal from the control unit 20. The driving motor 212 drives and rotates each of four wheels provided on the vehicle 2, for example, according to an instruction signal from the control unit 20. Alternatively, the driving motor 212 may drive one pair of wheels, of two pairs of front wheels and rear wheels.

The steering angle encoder 215 detects a steering angle indicating a traveling direction of a wheel at a predetermined detection time interval, and stores the steering angle in a register of the control unit 20. The steering angle is an angle of a rotation shaft of the wheel in the horizontal plane. For example, an origin of the angle is set in a direction at which the rotation shaft of the wheel is orthogonal to the traveling direction of the vehicle 2. Furthermore, the wheel encoder 210 acquires a rotation angle of the wheel at a predetermined detection time interval, and stores the rotation angle in the register of the control unit 20.

For example, the communication unit 205 is a communication unit for communicating with various servers and the like on a network through a public communication network connected to WiFi access points or mobile phone base stations, by connecting to the WiFi access points or the mobile phone base stations. The communication unit 205 performs wireless communication by wireless signals and a wireless communication method according to a predetermined wireless communication standard.

The GPS reception unit 216 receives time signal radio waves from a plurality of global positioning satellites orbiting the Earth, and stores the time signal radio waves in the register of the control unit 20. The microphone 213 detects audio, converts the audio into a digital signal, and stores the digital signal in the register of the control unit 20. The speaker 214 is driven by a D/A converter and an amplifier connected to a signal processing unit or the control unit 20, and reproduces audio including sound and voice. The microphone 213 and the speaker 214 may each include one that is provided facing the inside of the vehicle 2 and one that is provided facing the outside of the vehicle 2.

For example, the display 206 is provided on each side surface of the body of the vehicle 2 in a manner facing the outside of the vehicle 2. The display 206 is a liquid crystal display, an electro-luminescence panel or the like, for example. The display 207 with a touch panel is an input device for an instruction from a user, and is installed facing the inside of the vehicle 2, for example. However, such a case is not restrictive, and the display 207 with a touch panel may be installed near a door of the vehicle 2 in a manner facing the outside, for example.

The CPU 201 of the control unit 20 executes a computer program that is executably developed in the memory 202, and performs a process as the control unit 20. The memory 202 stores computer programs to be executed by the CPU 201, data to be processed by the CPU 201, and the like. For example, the memory 202 is a dynamic random access memory (DRAM), a static random access memory (SRAM), a read only memory (ROM), or the like. The image processing unit 203 processes data in the frame buffer obtained from the camera 208 every predetermined frame period, in coordination with the CPU 201. For example, the image processing unit 203 includes a GPU and an image memory as the frame buffer. The external storage device 204 is a non-volatile memory, and is a solid state drive (SSD), a hard disk drive or the like, for example.

For example, the control unit 20 acquires a detection signal from a sensor of each unit of the vehicle 2, via the interface IF1. Furthermore, the control unit 20 calculates a latitude and a longitude indicating a position on the Earth, from a detection signal from the GPS reception unit 216. Moreover, the control unit 20 acquires map data from a map information database stored in the external storage device 204, checks the calculated latitude and longitude against a position on the map data, and determines a current position. Furthermore, the control unit 20 acquires a route from the current position to a destination on the map data. Moreover, the control unit 20 detects an obstacle around the vehicle 2 on the basis of a signal from the obstacle sensor 209, the camera 208 or the like, determines the traveling direction such that the obstacle is avoided, and controls the steering angle.

Furthermore, the control unit 20 processes an image acquired from the camera 208 on a per-frame data basis, in coordination with the image processing unit 203, and detects a change on the basis of a difference between images and recognizes an obstacle, for example. Additionally, the control unit 20 may transmit frame data of an image from the camera 208 and audio data obtained from the microphone 213, from the communication unit 205 to the center server 1 on the network. Then, analysis of the frame data of the image and the audio data may be assigned to the center server 1.

Still further, the control unit 20 causes images, texts, and other information pieces to be displayed on the display 206. Furthermore, the control unit 20 detects an operation on the display 207 with a touch panel, and receives an instruction from a user.

FIG. 3 illustrates the interface IF1 as an example, but exchange of signals between the control unit 20 and a control target is not limited to be performed through the interface IF1. That is, the control unit 20 may include a plurality of signal exchange paths other than the interface IF1. Furthermore, in FIG. 3, the control unit 20 includes a single CPU 201. However, the CPU is not limited to a single processor, and may adopt a multiprocessor configuration. Alternatively, a single CPU connected by a single socket may have a multicore configuration. At least a part of processes of the above-described units may be performed by a processor other than the CPU, such as a dedicated processor such as a digital signal processor (DSP) or a graphics processing unit (GPU). At least a part of processes of the above-described units may be an integrated circuit (IC) or another digital circuit. An analog circuit may be included in at least a part of the above-described units.

Figure 4:
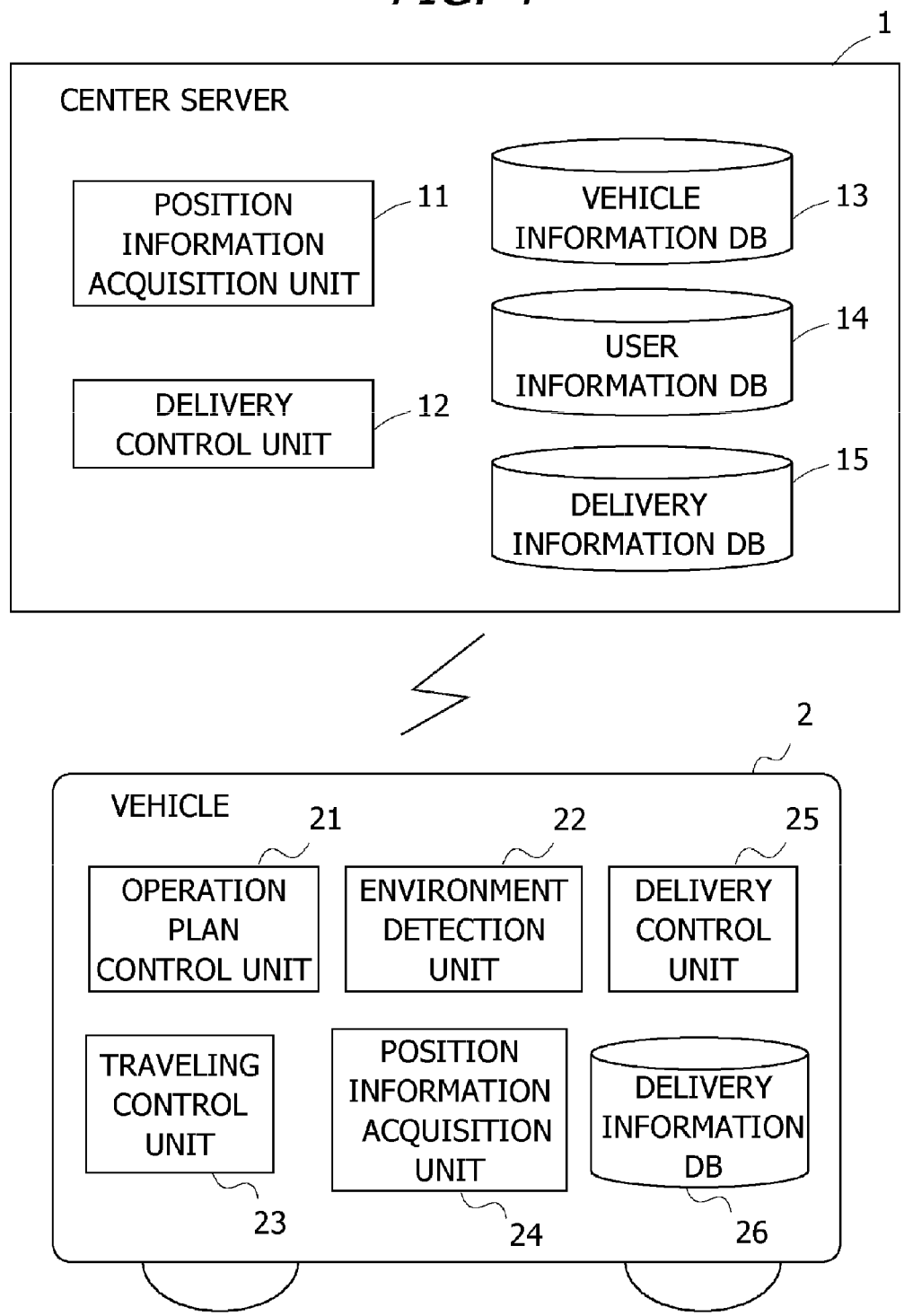
FIG. 4 is a diagram illustrating an example of a functional configuration of the center server and the vehicle.

FIG. 4 is a diagram illustrating an example of a functional configuration of the center server 1 and the vehicle 2. The center server 1 operates as each unit illustrated in FIG. 4 by computer programs in the memory 102. For example, the center server 1 includes, as functional structural elements, a position information acquisition unit 11, a delivery control unit 12, a vehicle information database (DB) 13, a user information DB 14, and a delivery information DB 15.

The position information acquisition unit 11 acquires the position information of the vehicle 2 transmitted from the vehicle 2 every predetermined period, and updates the position information of the vehicle 2 stored in the vehicle information DB 13 described later.

The delivery control unit 12 controls delivery of a package by the vehicle 2. More specifically, the delivery control unit 12 transmits, to the vehicle 2, an operation command as a delivery request. Furthermore, the delivery control unit 12 performs a substitute reception control process. The substitute reception control process is a control process regarding determination of the substitute person who is to receive a package on behalf in a case where the recipient at the delivery destination is absent, and handing over of the package to the substitute person. For example, the substitute reception control process is performed in a case where the recipient at the delivery destination is registered as a user of the delivery system 100, and is a user for whom reception of the service of substitute reception is set.

Specifically, the delivery control unit 12 detects arrival of the vehicle 2 at the delivery destination, from the position information of the vehicle 2. In the case of detecting arrival of the vehicle 2 at the delivery destination, the delivery control unit 12 transmits an arrival notification notifying of arrival of the delivery vehicle to the recipient terminal. For example, the arrival notification of the delivery vehicle includes authentication information for authentication of the recipient, a URL of a webpage for responding, and information about the delivery vehicle 2 (such as the external appearance, the license plate number, and the like). For example, the authentication information for authentication of the recipient is one or more among a password, a passcode, a barcode, a QR code (registered trademark), and the like. For example, the arrival notification of the delivery vehicle is transmitted by using an email or through push distribution.

For example, in the case where the recipient is at the delivery destination, and is capable of receiving the package, the recipient transmits a response indicating that reception is possible, from the recipient terminal to the center server 1. For example, in the case where the recipient is not present at the delivery destination, the recipient transmits a response indicating absence, from the recipient terminal to the center server 1. A response from the recipient terminal is input to the recipient terminal through a webpage, and is transmitted through HTTP, for example.

In the case where the response from the recipient terminal for the arrival notification indicates absence, or in the case where there is no response from the recipient terminal after a lapse of a predetermined time, for example, the delivery control unit 12 determines absence of the recipient. The time for waiting for a response from the recipient terminal, used for determination of absence of the recipient, may be arbitrarily set between 3 and 10 minutes, for example. However, a set range for the time for waiting for a response from the recipient terminal is not limited to such an example. Furthermore, the method of determining absence of the recipient is not limited to those described above.

In the case of determining absence of the recipient, the delivery control unit 12 determines whether to perform substitute reception or not. For example, in the case where the recipient is registered as a user in the delivery system 100, and is set to receive the service of substitute reception, the delivery control unit 12 determines to perform substitute reception. Next, the delivery control unit 12 determines the substitute person who is to perform substitute reception. In the case where candidate substitutes are set by the recipient, the delivery control unit 12 selects the substitute person from the candidate substitutes. In the case where candidate substitutes are not set by the recipient, the delivery control unit 12 selects the substitute person from users who are registered as contracted to act as a substitute person and registered addresses of whom are within a predetermined range of the delivery destination. For example, as the substitute person, a user may be randomly selected from candidate substitutes or target users who are registered as contracted to act as the substitute person, or a user who is closest to the delivery destination may be selected.

The delivery control unit 12 transmits, to the user terminal of the selected substitute person, a request for substitute reception. For example, the request for substitute reception includes information about the recipient (such as the name, user identification information, or the like), information about the package (such as the type of package, the size, and the like), a URL of a webpage for responding, a current position of the delivery vehicle, and the like. For example, the request for substitute reception is transmitted by an email or through push distribution.

For example, in the case where the user selected as the substitute person is able to accept the requested substitute reception, the user transmits a response indicating acceptance of substitute reception from the user terminal to the center server 1. For example, in the case where the user selected as the substitute person is not able to accept substitute reception, the user transmits a response indicating non-acceptance from the user terminal to the center server 1. A response from the user terminal of the user selected as the substitute person is input to the user terminal through a webpage, and is transmitted through HTTP, for example.

In the case where a response indicating acceptance of substitute reception is received from the user terminal of the user selected as the substitute person, the delivery control unit 12 determines the user as the substitute person, and transmits, to the substitute person terminal, authentication information for authentication of the substitute person and information about the package. The authentication information for authentication of the substitute person may be one or more among a password, a passcode, a barcode, a QR code, and the like. The authentication information for authentication of the substitute person may be the same information as the authentication information for authentication of the recipient, or may be different information. The information about the package may be identification information of the package, the size, a disposed position inside the vehicle 2, and the like, for example.

Moreover, the delivery control unit 12 transmits, to the vehicle 2, a notification of change to substitute reception indicating that the delivery is changed to substitute reception. For example, in the case where the authentication information is different for the recipient and the substitute person, the authentication information of the substitute person is transmitted to the vehicle 2, together with the notification of change. Furthermore, if traveling to the address of the substitute person is necessary, the delivery control unit 12 transmits, to the vehicle 2, a command to travel to the address of the substitute person, together with the notification of change. In the case where a response indicating rejection of substitute reception is received from the user terminal of the user selected as the substitute person, or in the case where no response is received after a lapse of a predetermined time, the delivery control unit 12 may determine re-delivery of the package and may notify the vehicle 2 of the determination, or may re-select the substitute person, for example.

Moreover, the delivery control unit 12 transmits a capturing start instruction to the vehicle 2. When handing over of the package to the substitute person is complete, captured data is transmitted from the vehicle 2 to the center server 1, together with a delivery completion notification based on substitute reception. The delivery control unit 12 transmits the captured data received from the vehicle 2 to the recipient terminal, together with the delivery completion notification. For example, in the case where the captured data is moving image data and is of a large size, a URL of a download page or a viewing page for the captured data may be transmitted, instead of the captured data itself. The captured data may be any of image data, moving image data, and the like, for example. Information about the substitute person, such as the address, the name and the user identification information of the substitute person, is also transmitted together with the delivery completion notification, for example.

Moreover, when the delivery completion notification based on substitute reception is received from the vehicle 2, the delivery control unit 12 gives an incentive to the user who acted as the substitute person. The incentive is one or more among a predetermined number of points that can be used for the service of the delivery system 100 or a service of an associated organization, a coupon, and cash, for example. More users may therefore be invited to contract to perform substitute reception. The delivery control unit 12 may transmit information about the incentive that is given, to the substitute person terminal.

The vehicle information DB 13, the user information DB 14, and the delivery information DB 15 are created in a memory area of the external storage device 104 of the center server 1, for example. The vehicle information DB 13, the user information DB 14, and the delivery information DB 15 are relational databases, for example. The vehicle information DB 13 stores information about the vehicle 2. The user information DB 14 stores information about a user wishing to receive a service provided by the delivery system 100. The delivery information DB 15 stores information about a delivery. Details of information stored in each of the DBs will be given later.

Any one of the functional structural elements of the center server 1, or a part of the processes thereof may be implemented by another computer that is connected to the network. Furthermore, a series of processes to be performed by the center server 1 may be performed by hardware or by software.

The vehicle 2 operates as each unit illustrated in FIG. 4 by computer programs in the memory 202. For example, the vehicle 2 includes, as functional structural elements, an operation plan control unit 21, an environment detection unit 22, a traveling control unit 23, a position information acquisition unit 24, a delivery control unit 25, and a delivery information DB 26.

For example, the position information acquisition unit 24 acquires, every predetermined period, the position information of the vehicle 2 that is acquired by the GPS reception unit 216 or the like, and transmits the position information to the center server 1. The position information of the vehicle 2 is latitude and longitude, for example. Alternatively, the position information of the vehicle 2 may be an address, for example. Moreover, the position information of the vehicle 2 that is acquired by the position information acquisition unit 24 is output to the operation plan control unit 21 and the traveling control unit 23, for example. Additionally, identification information of the vehicle 2 is also transmitted together with the position information, other notifications and the like that are transmitted from the vehicle 2.

The operation plan control unit 21 receives an operation command from the center server 1. Delivery information is also received together with the operation command. The delivery information that is received from the center server 1 includes identification information of a delivery, information about a delivery destination, information about a delivery target package, information about a scheduled delivery time, and the like, for example. The operation plan control unit 21 stores the received delivery information in the delivery information DB 26.

In a case where there is a plurality of delivery target packages, the operation plan control unit 21 determines a delivery order on the basis of the operation command and the delivery information, for example. The delivery order is determined for each time slot on the basis of information about the delivery destinations of packages scheduled to be delivered, for example. In a case where a delivery request is newly received, or in a case where a time that is a predetermined time before a start time of one scheduled delivery time slot is reached, for example, the operation plan control unit 21 creates an operation plan by calculating a route that runs along the delivery destinations of the packages scheduled to be delivered.

The operation plan includes data about the route where the vehicle 2 is to travel that is calculated in the above manner, and data specifying processes to be performed by the vehicle 2 at a part of the route or along the entire route. An example of the processes to be performed by the vehicle 2 is handing over of a package at a delivery destination. The operation plan control unit 21 outputs the created operation plan to the traveling control unit 23. The operation plan control unit 21 may also transmit the created operation plan to the center server 1.

The environment detection unit 22 detects ambient environment information of the vehicle 2 to be used for autonomous driving, on the basis of data acquired by various sensors installed in the vehicle 2. Detection targets of the environment detection unit 22 are, but not limited to, the number and positions of lanes, the number and positions of vehicles that are present in the periphery of the vehicle in question, the number and positions of obstacles (such as pedestrians, bicycles, structures, buildings, etc.) that are present in the periphery of the vehicle in question, a structure of a road, a road sign and the like. The detection targets may be anything as long as they are used to perform autonomous driving. For example, in a case where the sensor is a stereo camera, detection of an object in the periphery of the vehicle 2 is performed by subjecting image data captured by the stereo camera to image processing. Data about the ambient environment of the vehicle 2 detected by the environment detection unit 22 is output to the traveling control unit 23 described later.

For example, the traveling control unit 23 creates a control command for controlling autonomous driving of the vehicle in question, on the basis of the operation plan created by the operation plan control unit 21, data about the ambient environment of the vehicle 2 created by the environment detection unit 22, and the position information of the vehicle in question acquired by the position information acquisition unit 24. For example, when an operation plan is input from the operation plan control unit 21, the traveling control unit 23 secures safety of movement by determining whether there is an obstacle in a moving direction indicated by the operation plan. In the case where it is determined that there is no obstacle in the moving direction, the traveling control unit 23 creates a control command to cause the vehicle in question to travel along the route according to the operation plan. The created control command is transmitted to the driving motor 212. A known method may be adopted as the method for creating the control command for causing a vehicle to perform autonomous driving.

The delivery control unit 25 controls a delivery that the vehicle 2 is requested by the center server 1 to perform. Specifically, the delivery control unit 25 controls loading of a package, handing over of the package, and the like. For example, completion of loading or handing over of a package may be detected on the basis of an operation regarding loading completion or handing-over completion performed on the vehicle 2 by a staff member who loaded the package or a user who received the package, or may be detected by various sensors mounted in the vehicle 2. In the case of detecting loading completion or delivery completion based on handing-over completion, the delivery control unit 25 transmits a notification to the effect to the center server 1.

At the time of handing over of the package, the delivery control unit 25 performs user authentication. For example, the delivery control unit 25 holds, in the delivery information DB 26 described later, the authentication information of the recipient or the substitute person that is notified of by the center server 1, together with the delivery request or the notification of change to substitute reception. At the time of handing over of the package, the delivery control unit 25 urges input of the authentication by outputting a message on the display 207 with a touch panel that is installed near the delivery port for packages while facing outward, for example. In the case where the authentication information that is input matches the authentication information that is stored in the delivery information DB 26, the delivery control unit 25 assumes authentication success, and may allow the recipient or the substitute perform to take out the package, by opening the delivery port for packages, for example.

Furthermore, when an instruction to start capturing is received from the center server 1, together with the notification of change to substitute reception, the delivery control unit 25 starts capturing by the camera 208 that is installed near the delivery port for packages while facing outward, and starts recording of the captured data. For example, when user authentication of the substitute person succeeds, the delivery control unit 25 urges the substitute person to place the face of the substitute person and the identification information of the package attached to the package within a viewing angle of the camera 208, by outputting a message on the display 207 with a touch panel that is installed near the delivery port for packages while facing outward, for example. The identification information of a package is a sequence of numbers and alphabets, a barcode, a QR code or the like, and is often described on a transmittal form that is attached to the package.

For example, in the case where the face of the substitute person and the identification information of the package attached to the package are detected from a result of image recognition performed on a captured image of the camera 208 by the image processing unit 203, the delivery control unit 25 detects delivery completion by substitute reception, and stops capturing by the camera 208. Additionally, delivery completion by substitute reception may alternatively be determined on the basis of input of an operation regarding delivery completion performed by the substitute person on the display 207 with a touch panel, for example.

When delivery completion by substitute reception is detected, the delivery control unit 25 transmits, to the center server 1, the delivery completion notification based on substitute reception and the captured data. The captured data may then be deleted from the vehicle 2. The identification information of the delivery is transmitted together with the delivery completion notification, for example.

The delivery information DB 26 is created in a memory area of the external storage device 204 of the vehicle 2, for example. The delivery information DB 26 is a relational database, for example. The delivery information DB 26 stores information about a delivery.

Any of the functional structural elements of the vehicle 2 or a part of the processes thereof may be implemented by another computer that is connected to the network. Furthermore, a series of processes to be performed by the vehicle 2 may be performed by hardware or by software.

FIG. 5 is an example of a vehicle information management table in the center server 1. The vehicle information management table is stored in the vehicle information DB 13. Information about the vehicle 2 is stored in the vehicle information management table. In the example illustrated in FIG. 5, fields of vehicle ID and position are included in the vehicle information management table.

In the field of vehicle ID, identification information of the vehicle 2 is stored. In the field of position, position information of the vehicle 2 is stored. The position information of the vehicle 2 is received from the vehicle 2 every predetermined period. The field of the position of the vehicle 2 in the vehicle information management table is updated by the position information acquisition unit 11 every time the position information is received from the vehicle 2.

Additionally, information pieces to be held in the vehicle information management table are not limited to those illustrated in FIG. 5, and addition may be made as appropriate according to the embodiment.

FIG. 6 is an example of a user information management table in the center server 1. The user information management table is stored in the user information DB 14. Information about a user wishing to receive a service provided by the delivery system 100 is stored in the user information management table. In the first embodiment, users who wish to receive the service provided by the delivery system 100 are a user who wishes for substitute reception of a package at the time of being absent, and who may possibly become a recipient of a package, and a user who wishes to contract to perform substitute reception at the time of absence of another user, and who may possibly become the substitute person. Additionally, commercial premises such as convenience stores, hotels and shops may also be registered in the delivery system 100, for example. To register in the delivery system 100 as a user is synonymous with registration of information in the user information management table.

Fields of user ID, name, address, contact information, substitute reception usage setting, substitute person selection method, substitute contract setting, and acquired incentive are included in the user information management table illustrated in FIG. 6. In the field of user ID, identification information of a user is stored. In the field of name, the name of the user is stored. In the field of address, the address of the user is stored. The address of the user is possibly the address of the delivery destination. In the field of contact information, an email address of the user terminal 3, identification information of the user terminal 3 used in push distribution, or the like is stored, for example. The information stored in the field of contact information is used at the time of the center server 1 issuing a notification to the recipient terminal or the substitute person terminal.

In the field of substitute reception usage setting, information indicating whether reception of the service of substitute reception at the time of being absent is set by the user or not is stored. That reception of the service of substitute reception at the time of being absent is set by a user will be expressed below as "the service of substitute reception is set".

Information indicating whether the service of substitute reception is set or not is a flag, a code, or the like, for example. In the example illustrated in FIG. 6, in the case where the service of substitute reception is set, "YES" is stored in the field of substitute reception usage setting. In the case where the service of substitute reception is not set, "NO" is set in the field of substitute reception usage setting.

In the field of substitute person selection method, information indicating a selection method of the substitute person is included. In the first embodiment, the substitute person selection method is a method of arbitrarily selecting, by the delivery system 100, from users who are set as contracted to perform substitute reception, or a method of selecting from candidate substitutes specified in advance by the user. The information indicating a selection method of the substitute person is a flag, a code, or the like, for example. In the example illustrated in FIG. 6, in the case of arbitrarily selecting, by the delivery system 100, from users who are set as contracted to perform substitute reception, "ARBITRARY" is stored in the field of substitute person selection method. In the case of selecting from candidate substitutes specified in advance by the user, "SPECIFIED" is stored in the field of substitute person selection method. Additionally, in the case where information indicating that the service of substitute reception at the time of being absent is not set by the user is stored in the field of substitute reception usage setting, the field of substitute person selection method is empty.

In the field of substitute contract setting, information indicating whether a contract to perform substitute reception at the time of absence of another user is set by the user or not is stored. The information indicating whether a contract to perform substitute reception is set or not is a flag, a code, or the like, for example. In the example illustrated in FIG. 6, in the case where a contract to perform substitute reception at the time of absence of another user is set by the user, "YES" is stored in the field of substitute contract setting. In the case where a contract to perform substitute reception at the time of absence of another user is not set by the user, "NO" is stored in the field of substitute contract setting.

In the field of acquired incentive, information about an incentive that is already acquired by the user is stored. Additionally, information pieces to be held in the user information management table are not limited to those illustrated in FIG. 6, and may be changed as appropriate according to the embodiment.

FIG. 7 is a diagram illustrating an example of a candidate substitute specification information table in the center server 1. The candidate substitute specification information table is a table holding information about a candidate substitute specified by the user. The candidate substitute specification information table is stored in the user information DB 14.

The candidate substitute specification information table illustrated in FIG. 7 includes fields user ID, candidate substitutes #1, #2 and so on. In the field of user ID, identification information of the user is stored. In the fields of candidate substitutes #1, #2 and so on, information about persons specified by the user as candidate substitutes is stored. A plurality of candidate substitutes may be set, and the fields of candidate substitute are present in a corresponding number.

In the fields of candidate substitute, subfields of name, address and contact information are included. In the subfield of name, the name of a person who is a candidate substitute is stored. In the subfield of address, the address of the person who is a candidate substitute is stored. In the subfield of contact information, for example, an email address of the user terminal 3 of the person who is a candidate substitute, identification information of the user terminal 3 used in push distribution, or the like is stored. The information stored in the subfield of contact information is used at the time of the center server 1 issuing a notification to the substitute person terminal. Additionally, in the case where the person who is a candidate substitute is registered in the delivery system 100 as a user, identification information of the user in question (that is used in the user information management table) may be stored in the subfield of name, and the subfields of address and contact information may be empty. Information pieces to be stored in the candidate substitute specification information table are not limited to those illustrated in FIG. 7, and may be change as appropriate according to the embodiment.

FIG. 8 is an example of a delivery information management table in the center server 1. The delivery information management table is stored in the delivery information DB 15. The delivery information management table is a table holding information about a delivery. In the example illustrated in FIG. 8, fields of delivery ID, specified delivery time slot, delivery destination, delivery destination user, delivery vehicle ID, authentication information, and substitute person are included in the delivery information management table.

In the field of delivery ID, identification information of a delivery is stored. For example, the delivery ID may be used as identification information for identifying a package. In the field of specified delivery time slot, information indicating a desired delivery time slot specified at the time of a delivery request is stored. For example, in the case where the desired delivery time slot is not specified at the time of a delivery request, the field of specified delivery time slot is empty. In the field of delivery destination, the address of the delivery destination is stored. In the field of delivery destination user, the name of the recipient at the delivery destination is stored. In the field of delivery destination user, in the case where the recipient at the delivery destination is a user who is registered in the delivery system 100 as a user, user identification information of the user in question (that is used in the user information management table) is stored. Information pieces in the field of delivery ID, specified delivery time slot, delivery destination, and delivery destination user are the same as information pieces described on a transmittal form of the package.

In the field of delivery vehicle ID, identification information of the vehicle 2 in charge of the delivery is stored. The field of delivery vehicle ID is empty in an initial state, and identification information of the delivery vehicle 2 is stored by the delivery control unit 12 of the center server 1 when a delivery is assigned by the delivery control unit 12, for example.

In the field of authentication information, authentication information used for user authentication of the recipient is stored. For example, the authentication information is created by the delivery control unit 12 and is stored in the field of authentication information at the time of reception of a delivery request.

In the field of substitute person, information about the substitute person who is to perform substitute reception of the delivery is stored. For example, in the case where the substitute person is a user who is registered in the delivery system 100 as a user, user identification information of the substitute person is stored in the field of substitute person. For example, in the case where the substitute person is a user who is not registered in the delivery system 100 as a user, the name of the substitute person is stored in the section of substitute person. Additionally, in the first embodiment, a case where the substitute person is a user who is not registered in the delivery system 100 as a user is a case where the substitute person is to be selected from candidate substitutes who are specified in advance by the recipient. Additionally, the field of substitute person is empty in the initial state, and when the substitute person is determined, information about such substitute person is stored by the delivery control unit 12.

In the delivery system 100, in the case where the authentication information of a substitute person is set to be different from the authentication information of a recipient, a field of authentication information of a substitute person may also be provided in the delivery information management table. The authentication information of a substitute person in this case may also be created by the delivery control unit 12.

Additionally, information pieces to be held in the delivery information management table are not limited to those illustrated in FIG. 8, and may be changed as appropriate according to the embodiment. Furthermore, among information pieces held in the delivery information management table illustrated in FIG. 8, for example, an information piece with respect to which the value in the field of delivery vehicle ID corresponds to the identification information of the vehicle 2 is held in the delivery information DB 26 held by the vehicle 2.

<Flow of Processes>

Figure 9A:
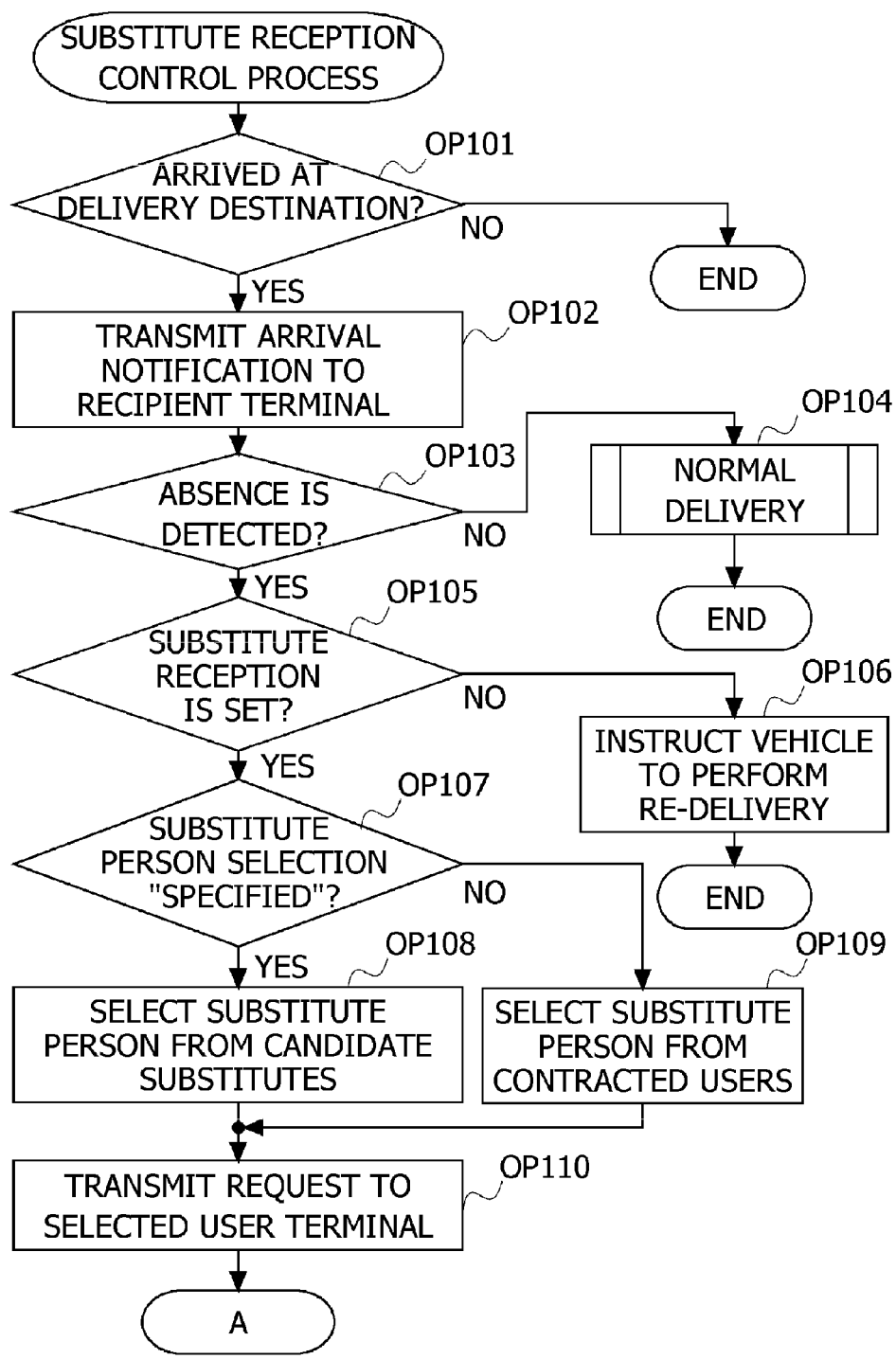
FIG. 9A is an example of a flowchart of the substitute reception control process by the center server.
Figure 9B:
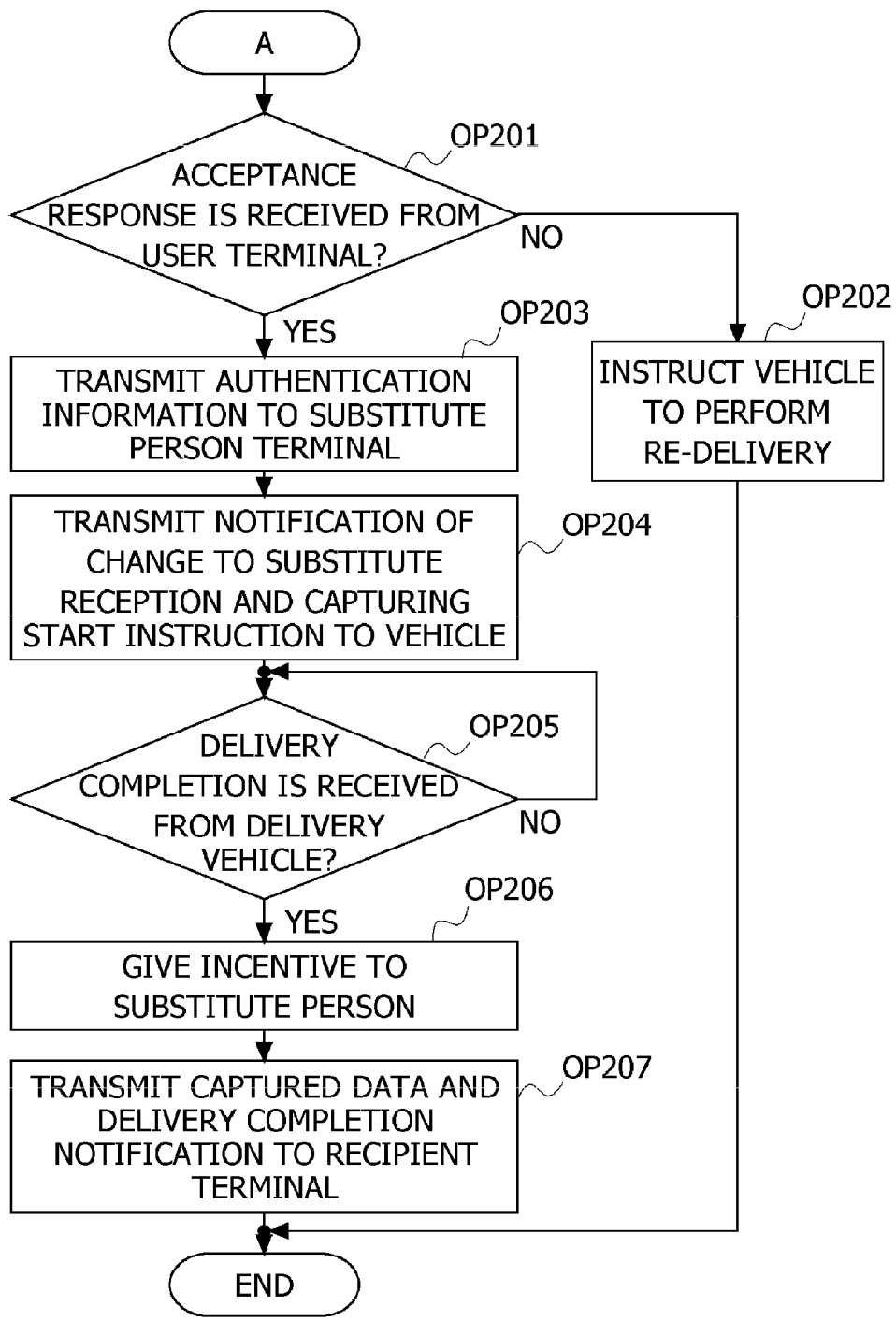
FIG. 9B is an example of a flowchart of the substitute reception control process by the center server.

FIGS. 9A and 9B are examples of a flowchart of the substitute reception control process by the center server 1. Processes illustrated in FIGS. 9A and 9B are started for one delivery, when the delivery is started, for example. The start of a delivery is detected on the basis of a start time of a specified delivery time slot being reached, a notification from the vehicle 2, or the like, for example. The processes illustrated in FIGS. 9A and 9B are performed by the CPU 101 of the center server 1, but a description will be given taking a functional structural element as a performer, for the sake of convenience.

In OP101, the delivery control unit 12 determines whether the vehicle 2 arrived at the delivery destination or not. For example, the delivery control unit 12 may make affirmative determination in OP101, in a case where the vehicle 2 is determined to have entered a predetermined range of the delivery destination, on the basis of the position information of the vehicle 2. In the case where the vehicle 2 arrived at the delivery destination (OP101: YES), the process proceeds to OP102. In the case where the vehicle 2 has not arrived at the delivery destination (OP101: NO), the process illustrated in FIG. 9A is ended, and is then performed again.

In OP102, the delivery control unit 12 transmits the arrival notification of delivery vehicle to the recipient terminal. For example, the arrival notification of delivery vehicle includes the authentication information, information about the package, information about the vehicle 2, and the like.

In OP103, the delivery control unit 12 determines whether absence of the recipient is detected or not. Absence of the recipient is determined in a case where a response indicating absence is received from the recipient terminal, or in a case where a response is not received from the recipient terminal even after a lapse of a predetermined time, for example. In contract, in a case where a response indicating presence at home is received from the recipient, the recipient is determined to be at home. In the case where absence of the recipient is detected (OP103: YES), the process proceeds to OP105. In the case where presence of the recipient at home is detected (OP103: NO), the process proceeds to OP104, and in OP104, delivery is normally performed, or in other words, the recipient comes to the vehicle 2, user authentication is performed, and the package is handed over. Then, the process illustrated in FIG. 9A is ended.

In OP105, the delivery control unit 12 determines whether the service of substitute reception is set by the recipient or not. With respect to the determination in OP105, affirmative determination is made in a case where information indicating that the service of substitute reception is set is stored in the field of substitute reception usage setting, in the user information management table (FIG. 6), corresponding to the recipient. On the other hand, with respect to the determination in OP105, negative determination is made in a case where the field of delivery destination user, in the delivery information management table (FIG. 8), corresponding to the delivery in question, does not indicate the user identification information, and in a case where information indicating that the service of substitute reception is not set is stored in the field of substitute reception usage setting, in the user information management table (FIG. 6), corresponding to the recipient.

In the case where the service of substitute reception is set by the recipient (OP105: YES), the process proceeds to OP107. In the case where the service of substitute reception is not set by the recipient (OP105: NO), the process proceeds to OP106, and in OP106, the delivery control unit 12 transmits an instruction for re-delivery to the vehicle 2. When the instruction for re-delivery is received from the center server 1, the vehicle 2 starts the next delivery. Then, the process illustrated in FIG. 9A is ended.

In OP107, the delivery control unit 12 determines whether the substitute person selection method set by the recipient is the method of selecting from candidate substitutes specified by the user ("SPECIFIED") or not. With respect to the determination in OP107, affirmative determination is made in a case where information indicating the method of selecting from candidate substitutes specified by the user ("SPECIFIED" in FIG. 6) is stored in the user information management table (FIG. 6), in the field of substitute person selection method corresponding to the recipient, and then, the process proceeds to OP108. On the other hand, with respect to the determination in OP107, negative determination is made in a case where information indicating that selection is to be arbitrarily performed, by the delivery system 100, from users who are set as contracted to perform substitute reception ("ARBITRARY" in FIG. 6) is stored in the user information management table (FIG. 6), in the field of substitute person selection method corresponding to the recipient, and then, the process proceeds to OP109.

In OP108, the delivery control unit 12 selects the substitute person from the candidate substitutes specified by the recipient. Information about the candidate substitutes specified by the recipient is acquired from the candidate substitute specification information table (FIG. 7). For example, in a case where a plurality of candidate substitutes are set, a candidate substitute closest to the delivery destination or a candidate substitute at the top of the list (candidate substitute #1) may be selected as the substitute person. However, selection criteria for the substitute person are not limited to the above.

In OP109, the delivery control unit 12 selects the substitute person from users whose addresses are within a predetermined range of the delivery destination and who are set as contracted to perform substitute reception. For example, a user closest to the delivery destination or a user who accepts to perform substitute reception most often may be selected as the substitute person. However, selection criteria for the substitute person are not limited to the above.

In OP110, the delivery control unit 12 transmits a request for substitute reception to the user terminal 3 of the user or the candidate substitute selected as the substitute person. For example, information about the recipient (name, user identification information, etc.), information about the package (size, type such as "refrigerated goods", etc.), and the like are also transmitted together with the request for substitute reception.

Next, in OP201 in FIG. 9B, the delivery control unit 12 determines whether a response indicating acceptance is received from the user terminal 3 of the user or the candidate substitute selected as the substitute person in relation to the request for substitute reception. In the case where a response indicating acceptance is received (OP201: YES), the process proceeds to OP203. In the case where a response indicating rejection is received, or in the case where a response is not received from the user terminal 3 for a predetermined time, negative determination is made (OP201: NO), and the process proceeds to OP202. In OP202, the delivery control unit 12 transmits an instruction for re-delivery to the vehicle 2. When the instruction for re-delivery is received from the center serve 1, the vehicle 2 starts the next delivery. Then, the process illustrated in FIG. 9B is ended.

In OP203, the delivery control unit 12 finally determines, as the substitute person, the user or the candidate substitute selected as the substitute person, and transmits authentication information for user authentication to the substitute person terminal. In the case where the format of authentication information is different between the recipient and the substitute person, the delivery control unit 12 generates the authentication information for the substitute person. The authentication information is acquired from the user information management table (FIG. 6).

In OP204, the delivery control unit 12 transmits, to the vehicle 2, the notification of change to substitute reception and the capturing start instruction. Information about the substitute person (for example, name, address, authentication information, etc.) is also transmitted together with the notification of change to substitute reception.

In OP205, the delivery control unit 12 determines whether the delivery completion notification is received from the vehicle 2 or not. In the case where the delivery completion notification is received from the vehicle 2 (OP205: YES), the process proceeds to OP206. In the case where the delivery completion notification is not received from the vehicle 2

(OP205: NO), the process in OP205 is repeated until the delivery completion notification is received. Captured data capturing the substitute person receiving the package is also received together with the delivery completion notification.

In OP206, the delivery control unit 12 gives an incentive to the substitute person. Furthermore, the value in the field of acquired incentive, in the user information management table, corresponding to the substitute person is updated.

In OP207, the delivery control unit 12 transmits the delivery completion notification to the recipient terminal. The captured data from the vehicle 2 or a URL of a webpage or the like for viewing the captured data is included together with the delivery completion notification. Then, the process illustrated in FIG. 9B is ended.

Additionally, the processes illustrated in FIGS. 9A and 9B are merely examples, and modification, addition, substitution and the like are possible according to the embodiment. Furthermore, the order of execution of processes is not limited to those illustrated in FIGS. 9A and 9B. For example, the process in OP206 and the process in OP207 in FIG. 9B may be performed in a reversed order.

Figure 10:
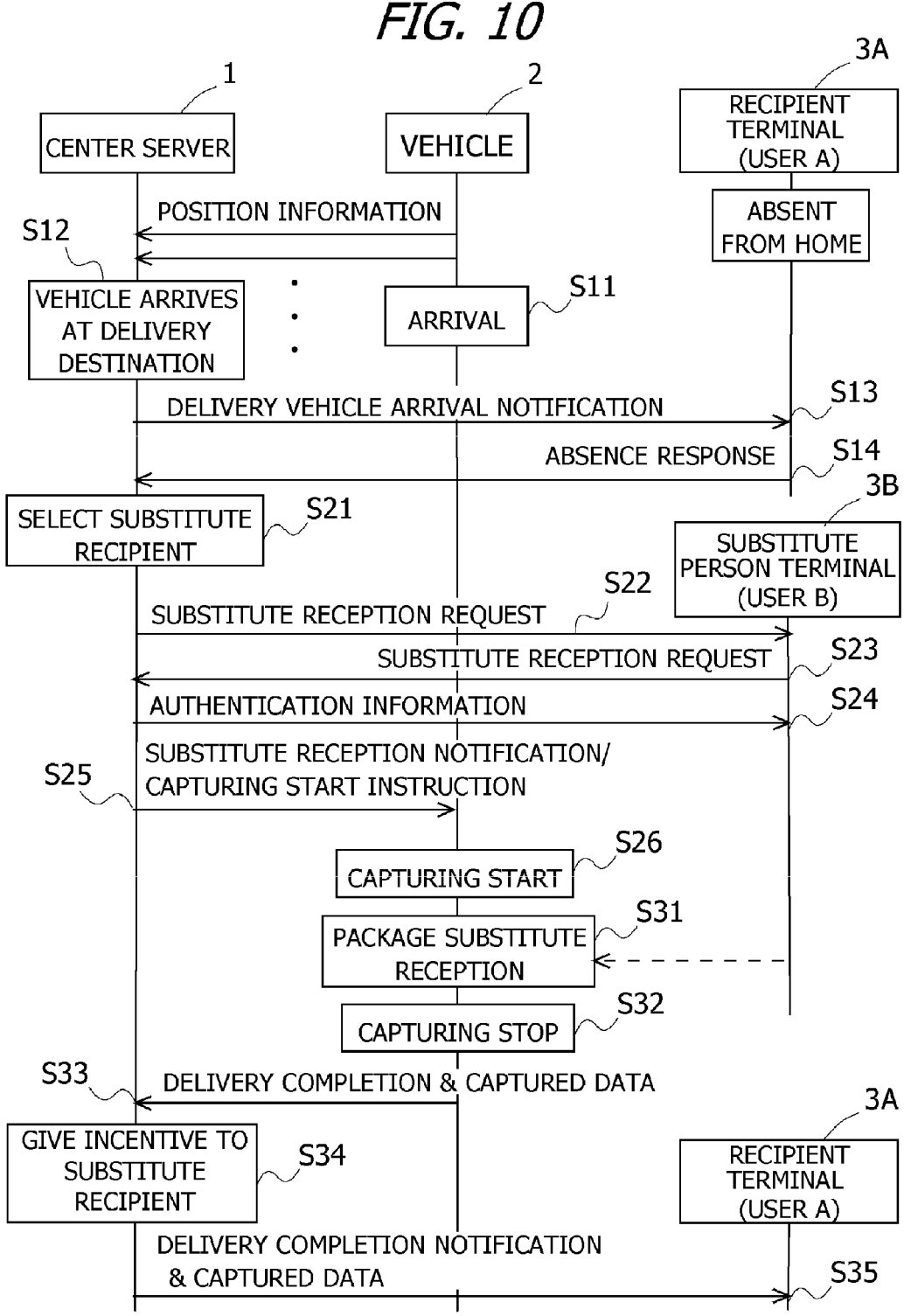
FIG. 10 is a diagram illustrating an example sequence of the substitute reception service provided by the delivery system according to the first embodiment.

FIG. 10 is a diagram illustrating an example sequence of the substitute reception service provided by the delivery system 100 according to the first embodiment. In FIG. 10, it is assumed that the vehicle 2 delivers a package, the delivery destination of which is the home of a user A. Accordingly, in FIG. 10, the user terminal 3 of the user A is a recipient terminal 3A. The vehicle 2 transmits the position information of the vehicle 2 to the center server 1 on regular basis. Furthermore, in FIG. 10, the user A, who is the recipient of the package, is assumed to be a user who is registered in the delivery system 100 as a user, and for whom the service of substitute reception at the time of being absent is set.

In S11, the vehicle 2 arrives at the home of the user A, which is the delivery destination of the package. In S12, the center server 1 detects arrival of the vehicle 2 at the home of the user A, which is the delivery destination, on the basis of the position information of the vehicle 2 (FIG. 9A, OP101: YES). In S13, the center server 1 transmits the arrival notification of delivery vehicle to the recipient terminal 3A (FIG. 9A, OP102). In S14, the user A, who received the delivery vehicle arrival notification, is absent from home, and thus, the user A transmits a response indicating absence from the recipient terminal 3A to the center server 1. The center server 1 receives the response indicating absence from the recipient terminal 3A (FIG. 9A, OP103: YES).

In S21, because the user A, who is the recipient, is registered in the delivery system 100 as a user and the service of substitute reception is set for the user A (FIG. 9A, OP105: YES), the center server 1 selects the substitute person who is to be requested to perform substitute reception (FIG. 9A, OP108 or OP109). In FIG. 10, it is assumed that candidate substitutes are set in advance by the user A, and that a user B is selected from the candidate substitutes as the substitute person.

In S22, the center server 1 transmits a substitute reception request to a user terminal 3B of the user B (FIG. 9A, OP110). For example, the substitute reception request includes a message requesting for substitute reception of the package of the user A, who is the recipient, and a URL of a webpage or the like for responding. In S23, the user B decides to perform substitute reception, and transmits a response indicating acceptance of substitute reception from the user terminal 3B to the center server 1. The center server 1 receives the response indicating acceptance of substitute reception from the user terminal 3B (FIG. 9B, OP201: YES).

The user B is thereby finally determined as the substitute person. In the following, the user terminal 3B will be referred to as a substitute person terminal 3B.

In S24, the center server 1 transmits the authentication information to the substitute person terminal 3B (FIG. 9B, OP203). In S25, the center server 1 transmits, to the vehicle 2, the notification of change to substitute reception and the capturing start instruction. A registered address or the like of the user B, who is the substitute person, is also transmitted together with the notification of change to substitute reception. Additionally, in the case where traveling to the registered address of the user B is necessary, the center server 1 transmits to the vehicle 2, in S25, a command to travel to the registered address of the user B. Furthermore, in the case where the authentication information of the substitute person is different from the authentication information of the recipient, the authentication information of the substitute person is also transmitted to the vehicle 2. In S26, the vehicle 2 starts capturing by the camera 208 that is installed near the delivery port for packages while facing outward.

In S31, the vehicle 2 and the user B meet, and user authentication is performed using the authentication information that the user B received in S24, and the package of the user A is handed over. The vehicle 2 continues capturing by the camera 208 during this time, and urges the user B to place the face and the identification information of the package attached to the package within the viewing angle of the camera 208, by outputting audio or text message such as "please turn your face and transmittal form toward the camera", for example. In S32, when it is determined that the face of the user B and the identification information of the package are captured, the vehicle 2 stops capturing.

In S33, the vehicle 2 determines completion of handing over of the package, and transmits the delivery completion notification and the captured data to the center server 1. The center server receives the delivery completion notification and the captured data from the vehicle 2 (FIG. 9B, OP204: YES).

In S34, the center server 1 gives an incentive to the user B, who is the substitute person (FIG. 9B, OP205). In S35, the center server 1 transmits the delivery completion notification and the captured data to the recipient terminal 3A (FIG. 9B, OP206). The user A may thereby check that the user B received the package on behalf, and may go to the registered address of the user B to receive the package.

For example, in the case where the homes (registered addresses) of the user A and the user B are adjacent to each other or are in the same apartment building, the vehicle 2 may meet up with the user B, who is the substitute person, without traveling, and this is highly efficient. Furthermore, in the case where the user B is a convenience store or the like, the user A may go and receive the package any time without worrying about the time. In this case, a staff member at the convenience store actually performs reception as the substitute person, and the staff member and the user A are highly likely not acquaintances, but because the face of a person who actually performed reception and the identification information of the package are captured and recorded at the time of reception of the package, dishonest treatment of the package may be prevented, and the recipient may feel reassured.

<Advantages and Effects of First Embodiment>

In the first embodiment, a package may be received by the substitute person on behalf even when the recipient is absent from the delivery destination, and thus, re-deliveries may be reduced. Furthermore, because the substitute person receiving the package is captured and recorded by the vehicle 2, and the captured data is transmitted to the recipient, security may be guaranteed for the package.

The recipient may register candidate substitutes for the substitute person in advance. In the case of substitute reception, the recipient himself/herself has to head to the substitute person to receive the package, and thus, a person who lives near the delivery destination is likely to be set as the candidate substitute. Furthermore, in the case where the center server 1 selects the substitute person, the substitute person is selected from users who live within a predetermined range of the delivery destination. Accordingly, because a substitute person is selected from people who live near the delivery destination, a travel between the delivery destination to the home of the substitute person is short, and the delivery efficiency may be increased.

Furthermore, the vehicle 2 is an autonomous vehicle and is managed by the center server 1, and thus, staff does not have to be deployed in the vehicle 2, and the number of staff may be reduced.

<Other Embodiments>

The embodiment described above is an example, and the present disclosure may be changed and carried out as appropriate without departing from the gist of the present disclosure.

In the first embodiment, the position of the vehicle 2 and the like are grasped by the center server 1, and the recipient, the substitute person, and the vehicle 2 are brought together mainly by the center server 1, but such a case is not restrictive, and the vehicle 2 may mainly serve such a role instead, for example. In this case, the vehicle 2 itself detects arrival at the delivery destination, transmits the arrival notification to the recipient terminal, selects the substitute person, transmits a request to the substitute person, and when substitute reception is complete, transmits the delivery completion notification and the captured data to the recipient terminal. Necessary information about setting of substitute reception for the recipient, candidate substitutes and the like are acquired from the center server 1. In this case, the vehicle 2 and each user terminal 3 may directly communicate with each other by near-field communication using Bluetooth (registered trademark) Low Energy (BLE) or the like, for example.

Moreover, in the first embodiment, the center server 1 selects one person as the substitute person, and transmits the substitute reception request to the user terminal 3 of the one person, but a plurality of people may be selected at once as the substitute person, and the substitute reception request may be transmitted to the user terminals 3 of the plurality of people. This may increase the possibility of the substitute person being finally determined by one request.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing system comprising:
   a vehicle that includes an image capturing device and a display and that delivers a package; and
   an information processing apparatus that includes a processor configured to determine, in a case where a recipient is not present at a delivery destination of the package, reception of the package by a substitute person present at a residence different from that of the recipient, wherein
   the vehicle is configured to:
      capture the substitute person receiving the package with the image capturing device,
      output, via the display, information for urging the substitute person to position a face of the substitute person and identification information of the package attached to the package within a viewing angle of the image capturing device, and
      determine that handing over of the package to the substitute person is completed in a case where the face of the substitute person and the identification information of the package attached to the package are detected from a result of an image recognition performed on a captured image of the image capturing device, and
   the processor is configured to transmit, in a case where reception of the package by the substitute person is completed, captured data of the image capturing device to a user terminal associated with the recipient, the captured data including the face of the substitute person and the identification information of the package attached to the package.

2. The information processing system according to claim 1, further comprising a memory configured to store user information including an address of a user, wherein
   the processor is configured to select the substitute person from the memory, from users, registered addresses of whom are within a predetermined range of the delivery destination.

3. The information processing system according to claim 1, further comprising a memory configured to store user information about a user specified by the recipient as a candidate substitute, wherein
   the processor is configured to select the substitute person from the memory, from users specified by the recipient.

4. The information processing system according to claim 1, wherein the vehicle is an autonomous vehicle.

5. An information processing method comprising:
   determining, in a case where a recipient is not present at a delivery destination of a package that is delivered by a vehicle including an image capturing device and a display, reception of the package by a substitute person present at a residence different from that of the recipient;
   capturing the substitute person receiving the package with the image capturing device;
   outputting, via the display, information for urging the substitute person to position a face of the substitute person and identification information of the package attached to the package within a viewing angle of the image capturing device;

determining that handing over of the package to the substitute person is completed in a case where the face of the substitute person and the identification information of the package attached to the package are detected from a result of an image recognition performed on a captured image of the image capturing device; and transmitting, in a case where reception of the package by the substitute person is completed, captured data captured by the image capturing device to a user terminal associated with the recipient, the captured data including the face of the substitute person and the identification information of the package attached to the package.

* * * * *